United States Patent Office 2,934,498
Patented Apr. 26, 1960

2,934,498

EXTRACTION OF AROMATICS WITH PYRIDINE HYDROCHLORIDE

Thomas D. Nevitt, Valparaiso, Ind., assignor to Standard Oil Company, Chicago, Ill., a corporation of Indiana No Drawing. Application January 28, 1957
Serial No. 636,482

4 Claims. (Cl. 208—326)

This invention relates to a process for the partial or complete resolution of hydrocarbon mixtures into their components by selective extraction thereof with a solvent comprising a solution of pyridine hydrochloride in water or a glycol. In one particular aspect this invention relates to the selective extraction of aromatic hydrocarbons from mixtures of aromatic and aliphatic hydrocarbons which are commercially produced as processed or unprocessed petroleum oils or mineral oils, coal tar oils, shale oils, and the like.

Various aromatic hydrocarbons are of value as solvents, plasticizers, and components of aviation gasoline or as intermediates in the preparation of a wide variety of chemical derivatives. The removal of aromatic hydrocarbons from various hydrocarbon stocks may be desired in order to improve the quality for thermal or catalytic cracking, for hydrogenation operations, for use as heater oils, and for other purposes.

With the commercial development of new processes for producing aromatic hydrocarbons boiling within the gasoline boiling range by cyclization-dehydrogenation of paraffinic hydrocarbons and by dehydrogenation of cycloalkanes, an increased demand has arisen for processes to separate and concentrate the aromatic hydrocarbons so produced. Thus, the commercial development of such processes as hydroforming, platinum catalyst reforming of naphthas, and the like, has created a tremendous potential for the production of nitration-grade aromatics such as benzene, toluene, and xylenes for use by both the petroleum and chemical industries.

An object of my invention is to provide a process for the selective extraction of hydrocarbon mixtures with specified novel solvents. Another object of my invention is to provide a method for the selective extraction of aromatic hydrocarbons from homogeneous mixtures thereof with aliphatic hydrocarbons, particularly saturated hydrocarbons. A further object is to provide a process for the concentration and purification of aromatic hydrocarbons, particularly those containing not more than 10 carbon atoms per molecule, by solvent extraction from hydrocarbon mixtures containing the same. These and other objects will become apparent from the following description thereof.

I have discovered that solutions of pyridine hydrochloride in water, in glycols having not more than four carbon atoms per molecule, or in glycol condensation polymers having not more than 6 carbon atoms per molecule, or in mixtures thereof, have excellent selective solvent properties which render them particularly valuable for the purposes described above. In preferred embodiments, I contemplate the use of saturated solutions of pyridine hydrochloride in water or diethylene glycol, or mixtures thereof. Pyridine hydrochloride ($C_5H_5N \cdot HCl$) is a salt of pyridine which is easily prepared by the reaction of stoichiometric quantities of pyridine and hydrochloric acid. In its pure form, pyridine hydrochloride is a colorless crystalline solid, melting above 100° C. and boiling at 220° C.

For convenience in the description which follows and in the appended claims, I shall use the terminology "hydroxy compound" to designate the compound in which pyridine hydrochloride is dissolved to make the novel solvents of my invention. This terminology does not imply the equivalence of all hydroxy compounds, but rather refers only to the class of such compounds which is defined hereinafter. Likewise, it should be understood that the word "solvent," unless otherwise indicated, refers to a solution of pyridine hydrochloride in one, or a mixture of two or more, of the hydroxy compounds of the defined class.

The hydroxy compounds which are suitable for use in accordance with my invention are water, glycols having not more than four carbon atoms per molecule, and glycol condensation polymers having not more than six carbon atoms per molecule. Preferred among these are water and diethylene glycol. The glycols and condensation polymers thereof, in the defined class, are stable, high-boiling, somewhat viscous liquids, completely miscible with water and are readily obtainable from commercial sources. Examples of suitable glycols include ethylene glycol, propylene glycol, trimethylene glycol, 1,3-butanediol, 2,3-butanediol, and 1,4-butanediol. Suitable glycol condensation polymers include diethylene glycol, triethylene glycol, dipropylene glycol, and dimethyl-1,4-dioxane. Although any of these compounds may be used, they are not equivalent with respect to their effect on the properties of the solvent solution, which properties depend on both the particular hydroxy compound used, and the concentration of the solution.

The preferred concentration of pyridine hydrochloride in the solvent solution is arrived at by adding the hydroxy compound, e.g., water, at the temperature at which the solution is to be used to the pyridine hydrochloride in an amount which is just sufficient to dissolve the latter. In other words, the preferred solvent solutions are saturated or approximately saturated with respect to pyridine hydrochloride at the extraction temperature. In general, such saturated solutions contain from about 5% to about 99% pyridine hydrochloride, depending on the temperature and the hydroxy compound used.

Although, as pointed out above, I prefer to use solutions which are saturated with respect to pyridine hydrochloride, solutions which are unsaturated or supersaturated can also be used. In general, unsaturated solutions are more selective in their extractive ability than are saturated solutions, although their capacity (i.e., the total quantity of material which can be extracted per unit volume of solvent) is lower. These properties (increased selectivity and decreased capacity) of unsaturated solutions become more pronounced as the concentration of pyridine hydrochloride is decreased from the saturation point. An unsaturated solution can be used advantageously in applications where exceptionally high purity of extracted material is desired, and where the accompanying decrease in capacity of the solvent is relatively unimportant.

Supersaturated solutions have correspondingly greater capacities than do saturated solutions and can be used advantageously in applications where the possible deposition of excess solid pyridine hydrochloride in the extraction equipment will not cause operating difficulties. In such cases, where the presence of solid pyridine hydrochloride can be tolerated, a contemplated variation of the use of solutions of pyridine hydrochloride as such comprises contacting the oil to be extracted with solid pyridine hydrochloride, followed by extraction with the hydrophilic compound. In these cases, the relative quantities of pyridine hydrochloride and hydrophilic compound used should be determined with due consideration of the selectivity and capacity characteristics of the resulting solution of pyridine hydrochloride, as outlined above.

The novel solvents of the present invention can be employed in conventional fashion, for example, in processes of liquid-liquid extraction, gas absorption, extractive distillation or azeotropic distillation. The resolution of a mixture of hydrocarbons of diverse structural type into its components by means of selective solvent extraction or absorption takes advantage of the differing degree of solubility of each structural type in the solvent. The solubility of a particular structural type depends roughly on the H/C ratio, i.e., the ratio of the number of hydrogen atoms to the number of carbon atoms in the molecule, and in general decreases as the H/C ratio increases. Thus, aromatics, which have the lowest H/C ratio, have the greatest solubility in the solvent and paraffins, having the highest H/C ratio, are least soluble. Other structural types having intermediate H/C ratios, such as cyclic olefins, acyclic olefins, and cycloparaffins, have intermediate solubilities under otherwise constant operating conditions. In general, hydrocarbons of mixed type, such as alkyl aromatics, have solubilities which are intermediate to those of the pure structural components.

In carrying out an extraction or absorption operation following the method of my invention, an amount of solvent should be used sufficient to maintain a distinct liquid phase in which the solvent is the predominant component. The proportion of solvent is usually selected within the range of about 0.5 to about 50 volumes, and preferably from about 1 to about 20 volumes, of solvent per volume of feed, especially in the treatment of naphtha or gasoline boiling range stocks (about 400° F. endpoint). The hydrocarbon feed mixture, for example, a non-viscous neutral oil boiling in the gasoline boiling range and containing aromatic hydrocarbons and aliphatic hydrocarbons, is first contacted either as a liquid or vapor with a suitable proportion of one or a mixture of two or more of my novel solvents in the liquid phase. A liquid extract phase containing the more aromatic portion of the feed stock as well as any other relatively polar impurities derived therefrom, for example, organic compounds of oxygen, nitrogen, or sulfur, is produced, which is then subjected to a suitable procedure for the recovery of the solvent and of the extracted material, such as distillation, extraction with a paraffin having a boiling point differing from that of the extracted material, fractional crystallization, and dilution with a material such as water which extracts the solvent, leaving a supernatant liquid layer containing extracted material. Solvent can be removed from the raffinate, or from the distillate in extractive distillation, by conventional means such as distillation or extraction with an auxiliary solvent which is specific for the principal solvent. Both the raffinate (or distillate) and the extracted materials can be subjected to such conventional after treatments as reextraction with the same or different solvents, washing with acids or alkalies, contacting with adsorbent materials, water-washing to remove traces of solvent, re-distillation, etc.

In liquid-liquid extraction, temperatures within the range of 0° C. to 150° C. can be employed. Economic consideration suggests the use of temperatures close to the ambient temperature and in general the range of about 30° C. to about 100° C. is preferred when technically feasible. Sufficient pressure is maintained within the extraction zone to insure that a liquid, predominantly solvent, phase is present at all times. It is obvious that pressure and temperature are related variables in the extraction process. Usually pressures of about 0 to 100 p.s.i.g. are sufficient, it being appreciated that the particular pressure which is required in a given case can readily be determined by experiment.

In extractive distillation processes the temperature is maintained between the dew point of the feed stock and about 240° C. The solvent solution ordinarily constitutes between about 5 and 97 weight percent of the total material present. Conventional extractive distillation conditions and equipment can be used.

It may be desirable in specific cases to use auxiliary solvents or diluents for modifying the selectivity of my novel solvents, or for other reasons. The amount of diluent to be used depends on the specific case, but in general, I prefer to use between about 1 and 20 weight percent, based on the principal solvent. The auxiliary solvent should be miscible to the desired extent with the principal solvent. Examples of auxiliary solvents which may be used are alcohols such as methanol, ethanol, and propanol; polyhydroxy compounds such as glycerol, and pentaerythritol; acids such as formic acid and lactic acid; ethanolamines such as mono-, di-, and tri-ethanolamine; liquid sulfur dioxide; the sulfolanes; dimethyl sulfoxide; various nitriles such as acetonitrile, bis-2-cyanoethyl ether and the like; ethers or glycol ethers; tetrahydrofuran and the like; $\beta$-, $\beta'$-oxydipropionitrile, $\beta$-, $\beta'$-thiadipropionitrile and the like; halogenated hydrocarbon solvents; ethylene carbonate; esters of monocarboxylic acids and dicarboxylic acids; $\gamma$-butyrolactone; neutral organic nitrogen compounds such as dimethyl formamide, dimethyl hydantoin, $\gamma$-butyrolactam and the like; ketones such as acetone, methyl ethyl ketone, methyl isobutyl ketone and the like; aldehydes such as furfuraldehyde, crotonaldehyde and the like; etc.

In addition to the auxiliary solvents or diluents described above, anti-solvents can also be used to aid in the extraction step. Suitable anti-solvents such as saturated hydrocarbons, perfluorocarbons, perfluoroamines, perfluoroethers and the like can be used in proportions of about 10 to 100 percent by volume of feed stock treated, and can either be added to the feed stock or introduced directly into the extraction zone.

In the extraction, a small proportion of a suitable surface-active agent can be added to increase the efficiency of the extraction equipment. For example, long chain esters of perfluoroalkanols or perfluoroalkyl acids, perfluoroalkyl amides and amines, etc., can be used, in suitable concentration between about 0.0001 and about 1 percent by weight of the solvent (note G. B. Blake et al., paper presented before the Division of Petroleum Chemistry of the American Chemical Society, September 1954, pp. 313 ff.).

The present invention can be carried out in batch, continuous, or semi-continuous operating cycles and in one or more actual or theoretical stages, using contacting and separation equipment such as has been conventionally employed in selective solvent refining of petroleum stocks. Various types of liquid-liquid extraction operations and suitable extraction equipment are well known in the art and can be used in the process of my invention. It should be understood that the specific equipment used forms no part of the present invention and that any equipment adaptable for the purpose of contacting the solvent with the hydrocarbon charging stock and thereafter separating an extract phase from the refined charging stock can be employed for the purpose of the invention.

The following experimental extraction data serve to illustrate the process of my invention. The table below contains the results of extractions with solutions of pyridine hydrochloride in water and in diethylene glycol. The feed stock, a mixture of equal volumes of toluene and n-heptane, was, in each instance, contacted under batch liquid-liquid extraction conditions with an equal volume of solvent solution at the temperature indicated. Liquid extract and raffinate layers were produced by settling and were separated. The distinct liquid layers were analyzed and selectivity values, i.e., beta ($\beta$) values, were calculated from the data. The $\beta$-value or separation factor indicated in the table is the molar ratio of toluene to heptane in the extract layer divided by the molar ratio of these hydrocarbons in the raffinate layer, and corresponds to alpha, the separation factor calculated in fractional distillation process.

Table

| Solvent | Temperature, °C. | Percent Total Toluene Extracted | Toluene in Extract, Weight Percent | β Value |
|---|---|---|---|---|
| Pyridine Hydrochloride and 12.5% Water | 25 | 6 | 98 | 40 |
| Pyridine Hydrochloride and 10% Water | 40 | 7-8 | 98 | 50 |
| Pyridine Hydrochloride and 22% Diethylene Glycol | 30 | 12 | 95 | 17 |

While the solvents of my invention are particularly effective in extracting aromatics from saturated hydrocarbons, they can be used in other separations as well, for example, the separation of olefins from aromatics, naphthenes from aromatics, naphthenes or paraffins from diolefins or olefins. In short, the novel solvents can be used for hydrocarbon type separations. They can also be used in other separations such as the extraction of organic sulfur, nitrogen or mixtures thereof, e.g., Fischer-Tropsch type naphthas, various crude oil fractions or the like. The solvents of this invention can also be used for the separation of unsaturated fatty acid esters from mixtures thereof with relatively saturated fatty acid esters. Other applications of the selective extraction solvents and process of my invention are in the selective extraction of normally gaseous unsaturated hydrocarbons from mixtures with normally gaseous paraffins, for example, the selective extraction of ethylene, propylene, or acetylene from gaseous hydrocarbon streams containing the same in admixture with hydrogen, methane, ethane, etc. By the use of the process of my invention it is possible to produce normally gaseous unsaturated hydrocarbons of high purity for use in applications where such high purities are deemed desirable or necessary.

While I have described my invention by references to specific embodiments thereof, the same are given by way of illustration only. Modifications and variations will be apparent from my description to those skilled in the art.

Having described my invention, I claim:

1. A process for the liquid-liquid selective extraction of an aromatic hydrocarbon from a hydrocarbon mixture containing the same, said hydrocarbon mixture boiling within the gasoline range, which process comprises contacting each volume of said mixture in the liquid phase with about 0.5 to about 50 volumes of a solvent consisting of an approximately saturated solution of pyridine hydrochloride containing from about 87.5 to about 99% pyridine hydrochloride in water, at a temperature between about 0° C. and 150° C. and separating a liquid raffinate phase from a liquid extract phase comprising said solvent and said aromatic hydrocarbon.

2. The process of claim 1 in which said hydrocarbon mixture comprises essentially monocyclic aromatic hydrocarbons containing not more than 10 carbon atoms per molecule and saturated hydrocarbons.

3. The process of claim 1 in which said contacting is effected at a temperature between about 30° C. and 100° C.

4. The process of claim 1 wherein said solvent contains about 12.5 weight percent of water.

References Cited in the file of this patent
UNITED STATES PATENTS
2,567,228    Morrell et al. _____ Sept. 11, 1951

OTHER REFERENCES

Hibshman: "Separation of Hydrocarbons by Solvent Extraction," Industrial & Engineering Chemistry, volume 41, No. 7, pages 1366–1374, July 1949.

Progress in Petroleum Technology, Advances in Chemistry Series No. 5, Bradley and Lake, Petroleum Distillation, Apr. 7, 1951, pages 205–209.